(12) United States Patent
Scindia et al.

(10) Patent No.: US 7,642,335 B2
(45) Date of Patent: Jan. 5, 2010

(54) POLYCARBONATE WITH HIGH REFRACTIVE INDEX

(75) Inventors: Subash Scindia, Bangalore (IN); Subarna Shyamroy, Navi Mumbai (IN)

(73) Assignee: SABIC Innovative Plastics IP B.V., Bergen op Zoom (NL)

(*) Notice: Subject to any disclaimer, the term of this patent is extended or adjusted under 35 U.S.C. 154(b) by 0 days.

(21) Appl. No.: 11/830,216

(22) Filed: Jul. 30, 2007

(65) Prior Publication Data

US 2009/0036633 A1 Feb. 5, 2009

(51) Int. Cl.
*C08G 65/38* (2006.01)
*C08G 64/00* (2006.01)
(52) U.S. Cl. .............. 528/219; 264/176.1; 264/219; 428/411.1; 428/412; 528/196; 528/198
(58) Field of Classification Search ........... 264/176.1, 264/219; 428/411.1, 412; 528/196, 198, 528/219
See application file for complete search history.

(56) References Cited

U.S. PATENT DOCUMENTS

| | | | |
|---|---|---|---|
| 5,344,910 A | 9/1994 | Sybert | |
| 5,401,826 A | 3/1995 | Sakashita et al. | |
| 5,532,331 A | 7/1996 | Bales et al. | |
| 7,202,323 B2* | 4/2007 | Fujimori et al. | 528/219 |
| 2005/0222334 A1* | 10/2005 | Srinivasan et al. | 525/178 |
| 2005/0250915 A1 | 11/2005 | Heuer et al. | |
| 2007/0123686 A1 | 5/2007 | Mahood et al. | |

FOREIGN PATENT DOCUMENTS

JP 2002114842 A 4/2002

OTHER PUBLICATIONS

PCT International Search Report for International Application No. PCT/IB2008/052964.

* cited by examiner

*Primary Examiner*—Terressa M Boykin

(57) ABSTRACT

An aromatic polycarbonate having a high refractive index and good processing and mechanical properties is provided. The aromatic polycarbonate comprises a thiodiphenol monomer and a biphenyl monomer. The refractive index of the polycarbonate may be greater than 1.670.

20 Claims, 1 Drawing Sheet

POLYCARBONATE WITH HIGH REFRACTIVE INDEX

BACKGROUND

The present disclosure generally relates to polycarbonates having a high refractive index and methods and compositions for preparing the same.

Polycarbonates are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous emulsion or in nonaqueous solution.

Polycarbonates have many properties and/or characteristics that are desired in certain instances. These include clarity or transparency (i.e. 90% light transmission or more), high impact strength, heat resistance, weather and ozone resistance, good ductility, being combustible but self-extinguishing, good electrical resistance, noncorrosive, nontoxic, etc. Furthermore, polycarbonates can be readily used in various article formation processes, such as molding (injection molding, etc.), extrusion, and thermoforming, among others. As a result, polycarbonates are used frequently to form a wide variety of products including: molded products, solution-cast or extruded films, structural parts, tubes and piping, lenses, safety shields, instrument windows, and medical devices. Household articles formed from polycarbonates can be produced in a great variety of colors and can be painted, glued, planed, pressed, and metalized and can be used to form precision parts and electronic products.

Other potential applications of polycarbonates require good optical properties like clarity and high refractive index. In this regard, the refractive index ("RI") is the ratio of the phase velocity of light in a vacuum to that in a specific medium. It is also known as index of refraction or the refractive constant.

The applications of polycarbonates which retain good optical properties include multi-layer diffuser and reflector films, and ophthalmic glasses, among others. Polycarbonates formed solely from bisphenol-A, which have a refractive index of 1.58, are used in some of these applications. It is also desirable to have a polycarbonate with a refractive index greater than that of a polycarbonate formed solely from bisphenol-A.

In U.S. Pat. No. 5,532,331, the entirety of which is hereby incorporated by reference, 4,4'-thiodiphenol has been copolymerized to form a polycarbonate having high refractive index.

In U.S. Pat. No. 5,344,910, the entirety of which is hereby incorporated by reference, the use of 2-phenyl-3,3-bis-(4-hydroxyphenyl)phthalimide (PPPBP), a bisphenol derived from phenolphthalein, is discussed. Copolymers of PPPBP were found to have poor melt stability during melt processing resulting in foamy polymer melts and moldings, and discoloration of the resin during melt processing. Use of PPPBP in high amounts also causes the polycarbonate to become brittle.

In U.S. Pat. No. 5,401,826, the entirety of which is hereby incorporated by reference, 4,4'-dihydroxybiphenyl was used with bisphenol-A to form a polycarbonate. However, the refractive index for this polycarbonate is not enhanced.

Accordingly, it is desirable to produce a relatively transparent polycarbonate with a high refractive index having good processing and mechanical properties.

BRIEF DESCRIPTION

Disclosed, in various embodiments, are polycarbonates which have a high refractive index. Also disclosed are processes and compositions for producing the same.

In embodiments, the polycarbonate is an aromatic polycarbonate comprising a first monomer of Formula (I) and a second monomer of Formula (II):

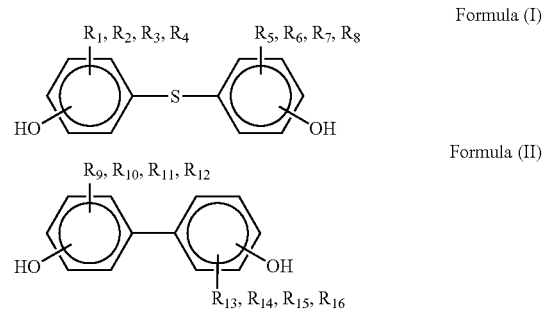

wherein $R_1$-$R_{16}$ are each independently selected from hydrogen, halogen, nitro, cyano, $C_1$-$C_{20}$ alkyl, $C_4$-$C_{20}$ cycloalkyl, and $C_6$-$C_{20}$ aryl; and wherein the molar ratio of the first monomer to the second monomer is from about 45:55 to about 75:25.

In further specific embodiments, the first monomer is 4,4'-thiodiphenol. In other specific embodiments, the second monomer is 4,4'-dihydroxybiphenyl. In further particular embodiments, the first monomer is 4,4'-thiodiphenol and the second monomer is 4,4'-dihydroxybiphenyl. In other embodiments, the molar ratio of the first monomer to the second monomer is about 70:30.

The aromatic polycarbonate may further comprise a third dihydroxy monomer which is different from the first monomer and the second monomer. The third monomer may be present in the amount of up to 100 molar parts, wherein the sum of the first and second monomers totals 100 molar parts.

In some embodiments, the third monomer is a bisphenol of Formula (III):

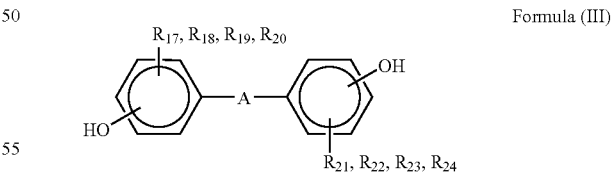

wherein A is selected from a bond, —O—, —S—, —SO$_2$—, $C_1$-$C_{12}$ alkyl, $C_6$-$C_{20}$ aromatic, and $C_6$-$C_{20}$ cycloaliphatic; and $R_{17}$-$R_{24}$ are each independently selected from hydrogen, halogen, nitro, cyano, $C_1$-$C_{20}$ alkyl, $C_4$-$C_{20}$ cycloalkyl, and $C_6$-$C_{20}$ aryl.

In particular embodiments, the third monomer is 2,2-bis (4-hydroxyphenyl) propane (bisphenol-A).

In other particular embodiments, the third monomer is 2-phenyl-3,3-bis(4-hydroxyphenyl)phthalimidine (PPPBP).

The aromatic polycarbonate may have a refractive index of at least 1.620, or optionally at least 1.670.

In other embodiments, the aromatic polycarbonate comprises 45 to 75 molar parts of a first monomer of Formula (I):

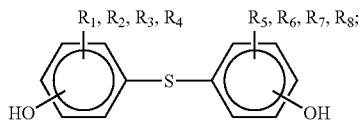

25 to 55 molar parts of a second monomer of Formula (II):

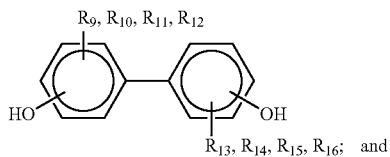

0 to 50 molar parts of a third monomer of Formula (III):

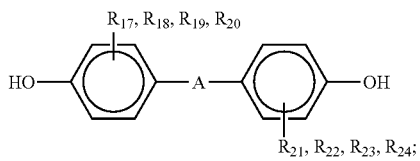

wherein $R_1$-$R_{24}$ are each independently selected from hydrogen, halogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic;

wherein the sum of the first and second monomers total 100 molar parts; and wherein the third monomer is different from the first and second monomers.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
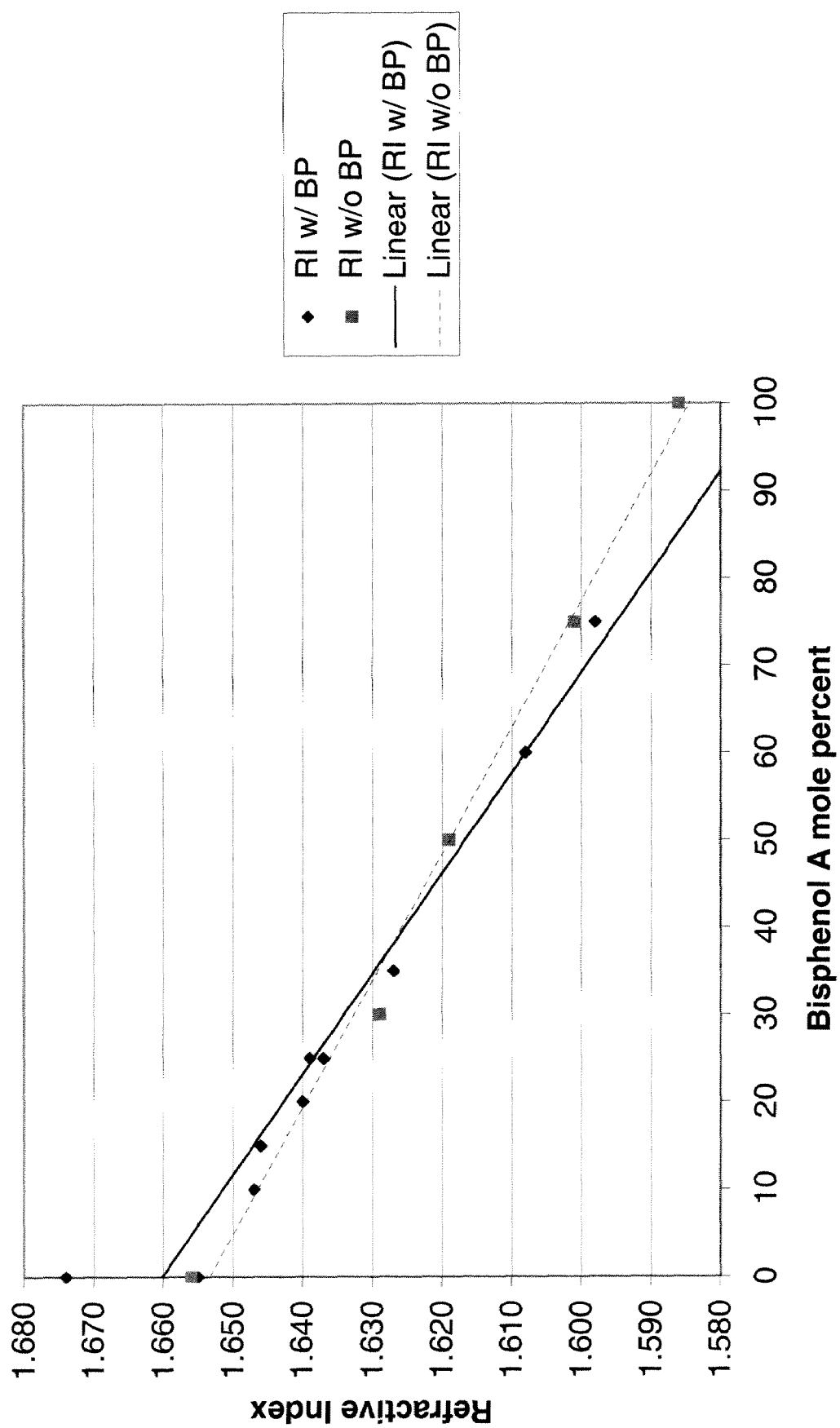
FIG. 1 is a graph of the refractive index (RI) versus the amount of bisphenol-A in the polycarbonate.

As used herein, "polycarbonate" refers to an oligomer or polymer comprising residues of one or more dihydroxy compounds joined by carbonate linkages; it also encompasses poly(carbonate-co-ester) oligomers and polymers.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The polycarbonates of the present disclosure have a high refractive index. They also have high chemical resistance and/or high heat resistance. The aromatic polycarbonates comprise a first monomer of Formula (I) and a second monomer of Formula (II):

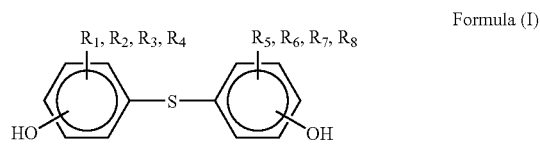

Formula (I)

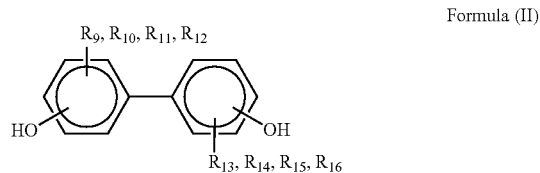

Formula (II)

wherein $R_1$-$R_{16}$ are each independently selected from hydrogen, halogen, nitro, cyano, $C_1$-$C_{20}$ alkyl, $C_4$-$C_{20}$ cycloalkyl, and $C_6$-$C_{20}$ aryl; and wherein the molar ratio of the first monomer to the second monomer is from about 45:55 to about 75:25.

In specific embodiments, the first monomer is 4,4'-thiodiphenol. In other specific embodiments, the second monomer is 4,4'-dihydroxybiphenyl. In further particular embodiments, the first monomer is 4,4'-thiodiphenol and the second monomer is 4,4'-dihydroxybiphenyl. In other embodiments, the molar ratio of the first monomer to the second monomer is about 70:30.

If desired, the aromatic polycarbonate may further comprise a third dihydroxy monomer. The third monomer is different from the first monomer and the second monomer, but may fall within Formulas (I) or (II). The third monomer may be present in the amount of from greater than zero parts up to 100 molar parts, wherein the sum of the first and second monomers totals 100 molar parts.

The third monomer may be a dihydroxy compound of formula (1)

HO-$A^1$-$Y^1$-$A^2$-OH  (1)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of $Y^1$ are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

In specific embodiments, the third monomer is a bisphenol compound of Formula (III):

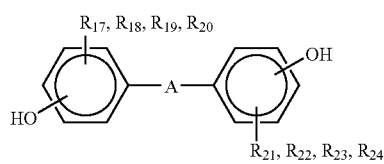

Formula (III)

wherein A is selected from a bond, —O—, —S—, —SO$_2$—, C$_1$-C$_{12}$ alkyl, C$_6$-C$_{20}$ aromatic, and C$_6$-C$_{20}$ cycloaliphatic; and R$_{17}$-R$_{24}$ are independently selected from hydrogen, halogen, nitro, cyano, C$_1$-C$_{20}$ alkyl, C$_4$-C$_{20}$ cycloalkyl, and C$_6$-C$_{20}$ aryl.

In some specific embodiments, the third monomer of Formula (III) is 2,2-bis(4-hydroxyphenyl)propane (bisphenol-A). Other illustrative bisphenols of Formula (III) include:
2,2-bis(3-bromo-4-hydroxyphenyl)propane;
2,2-bis(4-hydroxy-3-methylphenyl)propane;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4'-dihydroxy-3,3'-dimethyl-1,1-biphenyl;
4,4'-dihydroxy-3,3'-dioctyl-1,1-biphenyl;
4,4'-dihydroxydiphenylether; and
1,3-bis(2-(4-hydroxyphenyl)-2-propyl)benzene.

In other embodiments, the third monomer is 2-phenyl-3,3-bis(4-hydroxyphenyl)phthalimidine (PPPBP), having the structure shown below:

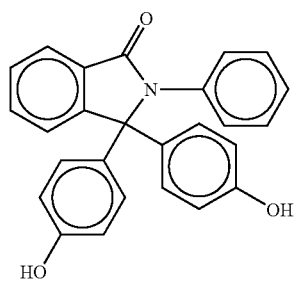

PPPBP

Polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula (R$^3$)$_4$Q$^+$X, wherein each R$^3$ is the same or different, and is a C$_{1-10}$ alkyl group; Q is a nitrogen or phosphorus atom; and X is a halogen atom or a C$_{1-8}$ alkoxy group or C$_{6-18}$ aryloxy group. Useful phase transfer catalysts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a C$_{1-8}$ alkoxy group or a C$_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester in the presence of a transesterification catalyst in a Banbury® mixer, twin screw extruder, or the like to form a uniform dispersion. Volatile monohydric phenol is removed from the molten reactants by distillation and the polymer is isolated as a molten residue. In addition, transesterification catalysts for use may include phase transfer catalysts of formula (R$^3$)$_4$Q$^+$X above, wherein each R$^3$, Q, and X are as defined above. Melt processes are generally carried out in a series of stirred tank reactors. The reaction can be carried out by either a batch mode or a continuous mode. The apparatus in which the reaction is carried out can be any suitable tank, tube, or column. Continuous processes usually involve the use of one or more continuous-stirred tank reactors (CSTRs) and one or more finishing reactors.

In embodiments, the carbonate precursor is an activated carbonate. As used herein, the term "activated carbonate" is defined as a diaryl carbonate which is more reactive than diphenylcarbonate toward transesterification reactions. Such activated carbonates are of the general formula (2):

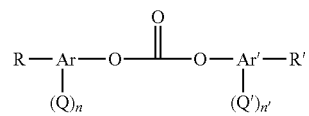

(2)

wherein Q and Q' are independently activating groups; Ar and Ar' are independently aromatic rings; n and n' are independently whole numbers from zero up to the number of replaceable hydrogen groups substituted on the aromatic rings Ar and Ar', wherein n+n' is greater than or equal to 1; and R and R' are independently selected from alkyl, substituted alkyl, cycloalkyl, alkoxy, aryl, alkylaryl having from 1 to 30 carbon atoms, cyano, nitro, halogen, and carboalkoxy. The number of R groups is a whole number and can be zero up to the number of replaceable hydrogen groups on the aromatic ring Ar minus the number n. The number of R' groups are a whole number and can be zero up to the number of replaceable hydrogen groups on the aromatic ring Ar' minus the number n'. The number and type of the R and R' substituents on the aromatic rings Ar and Ar' are not limited unless they deactivate the carbonate and lead to a carbonate which is less reactive than diphenylcarbonate. Typically, the R and R' substituents are located in the para, ortho, or a combination of the two positions.

Non-limiting examples of activating groups Q and Q' are: alkoxycarbonyl groups, halogens, nitro groups, amide groups, sulfone groups, sulfoxide groups, imine groups, and cyano groups.

Specific and non-limiting examples of activated carbonates include:
bis(o-methoxycarbonylphenyl)carbonate;
bis(o-chlorophenyl)carbonate;
bis(o-nitrophenyl)carbonate;
bis(o-acetylphenyl)carbonate;
bis(o-phenylketonephenyl)carbonate;
bis(o-formylphenyl)carbonate; and
bis(o-cyanophenyl)carbonate.

Unsymmetrical combinations of these structures, where the substitution number and type on Ar and Ar' are different, may also be used.

A preferred structure for an activated carbonate is an ester-substituted diaryl carbonate having the structure:

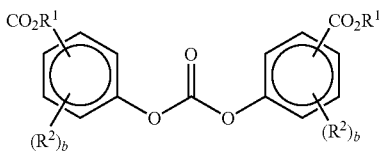

wherein $R^1$ is independently a $C_1$-$C_{20}$ alkyl radical, $C_4$-$C_{20}$ cycloalkyl radical, or $C_4$-$C_{20}$ aromatic radical; $R^2$ is independently a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from zero to 4. At least one of the substituents $CO_2R^1$ is preferably attached in an ortho position relative to the carbonate group.

Examples of preferred ester-substituted diaryl carbonates include, but are not limited to, bis(methylsalicyl)carbonate (also referred to as BMSC) (CAS Registry No. 82091-12-1), bis(ethyl salicyl)carbonate, bis(propyl salicyl)carbonate, bis(butylsalicyl)carbonate, bis(benzyl salicyl)carbonate, bis(methyl 4-chlorosalicyl)carbonate and the like. Typically bis(methylsalicyl)carbonate is preferred for use in melt polycarbonate synthesis due to its preparation from less expensive raw materials, lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, possesses a low volatility, and possesses a similar reactivity to bisphenol-A. The model transesterification reaction is carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. A preferred reaction temperature is 200° C. The choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diaryl carbonate.

Some non-limiting examples of non-activating groups which, when present in an ortho position relative to the carbonate group, would not be expected to result in activated carbonates are alkyl and cycloalkyl. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate.

Unsymmetrical combinations of these structures are also expected to result in non-activated carbonates.

If desired, a flow promoting agent such as dodecanoic dicarboxylic acid (DDDA) may also be added to the polycarbonate composition. The flow promoting agent may comprise up to 10 mole percent of the polycarbonate.

The combination of a thiodiphenol (the first monomer) and a biphenyl (the second monomer) has an unexpected synergistic effect on the refractive index of the polycarbonate. The refractive index of the copolymer containing both monomers can exceed that of the homopolymers for the two monomers. In particular, the homopolymer of 4,4'-thiodiphenol (TDP) has been synthesized and found to have a RI of 1.656. Based on theory, a 4,4'-dihydroxybiphenyl (BP) homopolymer should have a lower RI than that of TDP; however, this cannot be made due to the tendency of high BP content polymers to crystallize during polymerization. However, a TDP:BP copolymer with a molar ratio of 70:30 surprisingly has a significantly higher RI, 1.674. Thus, a synergistic effect is demonstrated. This increase in RI of 0.018 is significant because most polymers have an RI between 1.400 and 1.700. The increase in RI of 0.018 thus corresponds to a 6% increase over this range.

The polycarbonate having high refractive index has good ductility. Ductility is generally defined as the ability of the polycarbonate to deform without fracturing. One way to measure ductility is using the notched Izod impact test (ASTM D256). A sample is said to be ductile if it breaks in a ductile manner during the notched Izod impact test.

The polycarbonate having high refractive index may also be clear and/or transparent. This feature of the polycarbonate can be measured by its haze level. In embodiments, the polycarbonate has a haze level of less than 15. ASTM D1003-00 measures the haze and luminous transmittance of the thermoplastic. The standard requires reporting the thickness of the sample measured as well as the haze. The haze is generally measured at wavelengths from 380 nanometers to 780 nanometers.

Alternatively, the clarity and/or transparency can be measured by the opacity of the polycarbonate. Opacity is measured by the percent transmission (% T) of light through an article having a defined thickness. The higher the % T, the less opaque the article is and the more light passes through the article. The term "white light" is intended to cover all light in the visible spectrum, or all wavelengths from 380 nanometers to 780 nanometers. The % T should be measured with an article that is 0.75 millimeter thick. A D65 light source, 18 watt/220 volt, and 6500 Kelvin color temperature should be used with testing across the range of 380 to 780 nanometers at 5 nm intervals. In embodiments, the polycarbonate has a % T of at least 70 when measured at a thickness of 0.75 millimeter.

The polycarbonate having high refractive index is useful compared to homopolymers, such as a BP homopolymer. This utility derives partially from the lower crystallinity of the polycarbonate; typically, crystallinity is not desired at all. In embodiments, the polycarbonate has a crystallinity of less than 1%.

The following examples are provided to illustrate the polycarbonate compositions, articles, and methods of the present disclosure. The examples are merely illustrative and are not intended to limit the disclosure to the materials, conditions, or process parameters set forth therein.

EXAMPLES

Example 1

Sample polycarbonates were made using either a batch reaction or a melt reactive extrusion process. For all samples, the first monomer was 4,4'-thiodiphenol (TDP) and the second monomer was 4,4'-dihydroxybiphenyl (BP). Some samples included a third monomer, bisphenol-A (BPA).

In the batch reaction, a batch reactor was charged with the monomers and BMSC. The molar ratio of BMSC to the monomers was 1.025. The reactor was kept at 180° C. at atmospheric pressure for 35 minutes followed by a polymerization profile involving 35 minutes at atmospheric pressure and 220° C., 20 minutes at 230° C. and 100 millibar, and finally 15 minutes at 320° C. and zero millibar. The samples were molded on an L&T 60 ton injection-molding machine having a plaque mold of 60 mm×60 mm×3.2 mm. Molding conditions are shown in Table 1. The refractive indices of the plaques were obtained with a Woolam M2000UI Spectroscopic Ellipsometer by fitting surface polarization data using a Cauchy model for the refractive index dependence on wavelength. The reported refractive indices are values at 589.2 nanometers.

In the melt reactive extrusion process, a stainless steel stirred tank reactor was charged with the monomers together with BMSC and para-cumyl phenol (PCP), an endcapping agent. Also added to the reactor was an amount of an aqueous catalyst solution of tetramethylammonium hydroxide (TMAH) and sodium hydroxide (NaOH) corresponding to $25 \times 10^{-6}$ moles TMAH and $2 \times 10^{-6}$ moles NaOH per total number of moles of diols. The reactor was then evacuated and purged with nitrogen three times to remove residual oxygen and then held at a constant vacuum pressure of 800 millibar. The reactor was then heated to 170° C. in order to melt and react the mixture. Approximately 300 minutes after the start of heating (of the reactor tank), the reactor was pressurized with nitrogen to a constant overpressure of 0.9 bar, and the molten reaction mixture was fed through a 170° C. heated feed-line into an extruder at a rate of 11.5 kg/hr. Fifteen minutes before starting the feed to the extruder, an aqueous catalyst solution of sodium hydroxide (NaOH) in an amount corresponding to $4-14 \times 10^{-6}$ moles of NaOH per total number of moles of diols was added to the reactor. The extruder was a W&P ZSK25WLE 25 mm 13-barrel twin-screw extruder with an L/D of 59. The feed into the extruder comprised a flash-valve to prevent boiling of the molten mixture. The reaction mixture was reactively extruded at a screw speed of 300 rpm. The extruder was equipped with five forward vacuum vents and one back vent. The methyl salicylate byproduct was removed via devolatilization through these vents. The vacuum pressure of the back vent was 6 to 14 millibar. The vacuum pressure of the first forward vent was 7 to 21 millibar. The vacuum pressure of the final four forward vents was less than 1 millibar. The samples were molded on an Engel 45 machine into plaques having dimensions of 60 mm×60 mm×2.5 mm.

TABLE 1

Molding conditions.

| Conditions | Unit | L&T Machine | Engel Machine |
| --- | --- | --- | --- |
| Clamping Force | ton | 60 | 45 |
| Predry Temperature | ° C. | 80-100 | 80 |
| Predry Time | hr | 2-4 | 3 |
| Temperature Hopper | ° C. | 70 | 40 |
| Temperature Zone 1 | ° C. | 250 | 280 |
| Temperature Zone 2 | ° C. | 260 | 290 |
| Temperature Zone 3 | ° C. | 270 | 300 |
| Nozzle Temperature | ° C. | 280 | 295 |
| Mold Temperature | ° C. | 70 | 90 |
| Cooling Time | sec | 9 | 20 |

A total of 15 samples were made, as shown in Table 2. The figures for TDP, BP, and BPA are in molar parts.

TABLE 2

| Sample # | TDP | BP | BPA | RI w/ BP | RI w/o BP | Method | NII @ 23° C. Ft-lb/inch | Failure Mode |
|---|---|---|---|---|---|---|---|---|
| 1 | 100 | 0 | 0 | | 1.656 | Continuous | 8.1 | Ductile |
| 2 | 70 | 30 | 0 | 1.674 | | Continuous | Not Tested | |
| 3 | 70 | 0 | 30 | | 1.629 | Continuous | Not Tested | |
| 4 | 70 | 15 | 15 | 1.646 | | Continuous | Not Tested | |
| 5 | 50 | 25 | 25 | 1.637 | | Continuous | Not Tested | |
| 6 | 50 | 25 | 25 | 1.639 | | Batch | Not Tested | |
| 7 | 25 | 0 | 75 | | 1.601 | Batch | Not Tested | |
| 8 | 0 | 25 | 75 | 1.598 | | Batch | 9.8 | Ductile |
| 9 | 75 | 25 | 0 | 1.655 | | Batch | 7.4 | Ductile |
| 10 | 60 | 30 | 10 | 1.647 | | Batch | 6.8 | Ductile |
| 11 | 60 | 20 | 20 | 1.640 | | Batch | 9.5 | Ductile |
| 12 | 50 | 15 | 35 | 1.627 | | Batch | 9.5 | Ductile |
| 13 | 25 | 15 | 60 | 1.608 | | Batch | 7.3 | Ductile |
| 14 | 50 | 0 | 50 | | 1.619 | Batch | 10.0 | Ductile |
| 15 | 0 | 0 | 100 | | 1.586 | Batch | — | Ductile |

For comparison purposes, the RIs were reported depending on whether or not biphenyl was included in the polycarbonate. The RI was then plotted against the amount of BPA to show the synergistic effect. The graph of RI vs. amount of BPA is FIG. 1. When the refractive indexes of the polycarbonate without BP are plotted against those polycarbonates with BP, the synergistic effect is seen when the amount of BPA is less than about 50 mole %. (The two lines intersect at 46 mole %.) That synergistic effect is attributable to the presence of TDP and BP in the copolymer.

Another way of describing the line marked "RI w/o BP" is that this line describes the situation where BPA is being replaced by TDP alone. The line marked "RI w/ BP" describes the situation where BPA is being replaced by TDP and BP. The slope of the "RI w/o BP" line is less steep than the slope of the "RI w/ BP" line. Samples 8 and 9 also show that BP boosts the RI less than TDP. However, the combination of TDP and BP boosts the RI more than expected by the addition of either monomer alone.

The synergy can be seen by comparing samples 8 and 9 against sample 15, the BPA homopolymer. The RIs of samples 8 and 9 are higher than that of sample 15, showing the effect of TDP and BP on the RI, respectively. The RIs of samples 8 and 9, when compared against sample 1, the TDP homopolymer, suggest that copolymers should not have an RI greater than that of the TDP homopolymer. However, surprisingly, the RI of sample 2 is significantly higher.

It should be noted that the RI value of sample 2 was the average of the RI as measured in the flow direction and the cross-flow direction of the sample. Those two values were 1.682 and 1.666, respectively, both of which are still significantly higher than sample 1.

The failure modes for some of the samples are also listed. In particular, the polycarbonates containing a large amount of TDP were brittle and could not be molded. However, adding BP and BPA allowed a material to be made which could be molded and had a measurable impact, as indicated by the ductile failure mode, and also had a high RI.

The polycarbonates of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. An aromatic polycarbonate comprising a first monomer of Formula (I) and a second monomer of Formula (II):

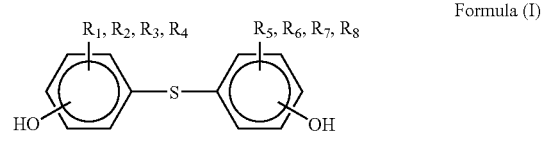

Formula (I)

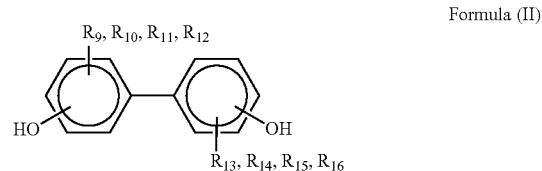

Formula (II)

wherein $R_1$-$R_{16}$ are each independently selected from hydrogen, halogen, nitro, cyano, $C_1$-$C_{20}$ alkyl, $C_4$-$C_{20}$ cycloalkyl, and $C_6$-$C_{20}$ aryl; and wherein the molar ratio of the first monomer to the second monomer is from about 45:55 to about 75:25, and wherein the aromatic polycarbonate has a reflective index of at least 1.62.

2. The aromatic polycarbonate of claim 1, wherein the first monomer is 4,4'-thiodiphenol.

3. The aromatic polycarbonate of claim 1, wherein the second monomer is 4,4'-dihydroxybiphenyl.

4. The aromatic polycarbonate of claim 1, wherein the first monomer is 4,4'-thiodiphenol and the second monomer is 4,4'-dihydroxybiphenyl.

5. The aromatic polycarbonate of claim 4, wherein the molar ratio of the first monomer to the second monomer is about 70:30.

6. The aromatic polycarbonate of claim 1, further comprising up to 100 molar parts of a third monomer, wherein the sum of the first and second monomers total 100 molar parts; and the third monomer is different from the first and second monomers.

7. The aromatic polycarbonate of claim 6, wherein the third monomer is a bisphenol of Formula (III):

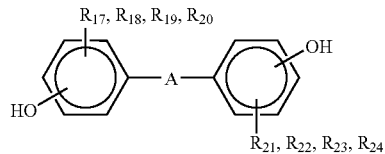

Formula (III)

wherein A is selected from a bond, —O—, —S—, —SO$_2$—, C$_1$-C$_{12}$ alkyl, C$_6$-C$_{20}$ aromatic, and C$_6$-C$_{20}$ cycloaliphatic; and R$_{17}$-R$_{24}$ are each independently selected from hydrogen, halogen, nitro, cyano, C$_1$-C$_{20}$ alkyl, C$_4$-C$_{20}$ cycloalkyl, and C$_6$-C$_{20}$ aryl.

8. The aromatic polycarbonate of claim 6, wherein the third monomer is 2,2-bis(4-hydroxyphenyl)propane (bisphenol-A).

9. The aromatic polycarbonate of claim 6, wherein the third monomer is 2-phenyl-3,3-bis(4-hydroxyphenyl)phthalimidine (PPPBP).

10. The aromatic polycarbonate of claim 1, having a refractive index of at least 1.67.

11. The aromatic polycarbonate of claim 1, having a notched Izod impact of greater than 6 foot-lb/inch when measured at 23° C. with 3.18 mm thickness according to ASTM D256.

12. The aromatic polycarbonate of claim 1, having a haze level of less than 15 when measured at a sheet thickness, according to ASTM D1003-00.

13. The aromatic polycarbonate of claim 1, having a % T of at least 70 when measured at a thickness of 0.75 millimeter.

14. The aromatic polycarbonate of claim 1, having a crystallinity of less than 1%.

15. An aromatic polycarbonate, comprising:
  45 to 75 molar parts of a first monomer of Formula (I):

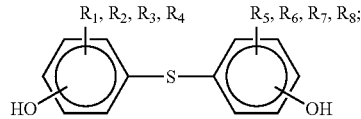

25 to 55 molar parts of a second monomer of Formula (II):

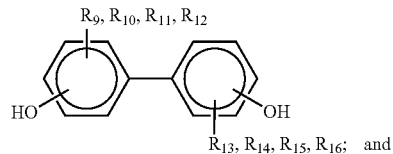
and 0 to 100 molar parts of a third monomer of Formula (III):

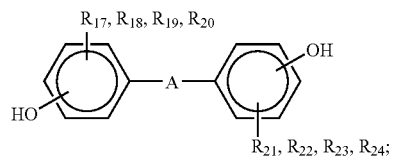

wherein R$_1$-R$_{24}$ are each independently selected from hydrogen, halogen, nitro, cyano, C$_1$-C$_{20}$ alkyl, C$_4$-C$_{20}$ cycloalkyl, and C$_6$-C$_{20}$ aryl; and A is selected from a bond, —O—, —S—, —SO$_2$—, C$_1$-C$_{12}$ alkyl, C$_6$-C$_{20}$ aromatic, and C$_6$-C$_{20}$ cycloaliphatic;
  wherein the sum of the first and second monomers total 100 molar parts;
  wherein the third monomer is different from the first and second monomer, and wherein the aromatic polycarbonate has a refractive index of at least 1.62.

16. The aromatic polycarbonate of claim 11, having a refractive index of at least 1.670.

17. An article formed from the aromatic polycarbonate of claim 1.

18. An extruded or molded article formed from the aromatic polycarbonate of claim 11.

19. An aromatic polycarbonate, comprising:
  45 to 75 molar parts of a first monomer of 4,4'-thiodiphenol;
  25 to 55 molar parts of a second monomer of 4,4'-dihydroxybiphenyl; and
  0 to 100 molar parts of a third monomer of 2,2-bis(4-hydroxyphenyl)propane;
  wherein the sum of the first and second monomers total 100 molar parts, and wherein the aromatic polycarbonate has a refractive index of at least 1.62.

20. The aromatic polycarbonate of claim 19, having a % T of at least 70 when measured at a thickness of 0.75 millimeter, and having a notched Izod impact of greater than 6 foot-lb/inch when measured at 23° C. with 3.18 mm thickness according to ASTM D256.

\* \* \* \* \*